United States Patent
Fischer et al.

(10) Patent No.: US 7,880,436 B2
(45) Date of Patent: Feb. 1, 2011

(54) SYSTEM AND METHOD FOR PREDICTIVE MANAGEMENT OF ENERGY SUPPLY TO A TRANSPORT DEVICE

(75) Inventors: Gerhard Fischer, Erlangen (DE); Maarten Holland, Poxdorf (DE)

(73) Assignee: Siemens Aktiengesellschaft, München (DE)

( * ) Notice: Subject to any disclaimer, the term of this patent is extended or adjusted under 35 U.S.C. 154(b) by 724 days.

(21) Appl. No.: 11/570,385

(22) PCT Filed: Jun. 7, 2005

(86) PCT No.: PCT/EP2005/052619

§ 371 (c)(1), (2), (4) Date: Oct. 1, 2007

(87) PCT Pub. No.: WO2005/120883

PCT Pub. Date: Dec. 22, 2005

(65) Prior Publication Data

US 2008/0246436 A1 Oct. 9, 2008

(30) Foreign Application Priority Data

Jun. 11, 2004 (DE) .................. 10 2004 028 353

(51) Int. Cl.
*H02J 7/00* (2006.01)
(52) U.S. Cl. .................. 320/124; 320/102; 320/104
(58) Field of Classification Search .................. 320/124
See application file for complete search history.

(56) References Cited

U.S. PATENT DOCUMENTS

| | | | |
|---|---|---|---|
| 6,314,347 B1 | 11/2001 | Kuroda et al. | |
| 6,380,852 B1 * | 4/2002 | Hartman et al. | 340/521 |
| 6,487,477 B1 * | 11/2002 | Woestman et al. | 701/22 |
| 2002/0062183 A1 * | 5/2002 | Yamaguchi et al. | 701/22 |
| 2002/0145402 A1 * | 10/2002 | Ueda et al. | 320/104 |
| 2002/0174798 A1 | 11/2002 | Kumar | |

FOREIGN PATENT DOCUMENTS

| | | |
|---|---|---|
| DE | 195 30 110 C2 | 2/1997 |
| DE | 198 26 551 C1 | 11/1999 |
| DE | 200 01 113 U1 | 5/2000 |
| DE | 100 05 581 A1 | 10/2000 |
| DE | 198 04 204 C2 | 3/2001 |
| EP | 0 811 757 A | 12/1997 |
| EP | 1 256 476 A | 11/2002 |

\* cited by examiner

*Primary Examiner*—Edward Tso
*Assistant Examiner*—Arun Williams
(74) *Attorney, Agent, or Firm*—Henry M. Feiereisen; Ursula B. Day (57) ABSTRACT

An energy management system for a transport device, in particular for a motor vehicle running on fuel and electricity, includes an energy source, an intermediate energy store and an electric energy consumer, in particular an electric drive. Control and/or regulation of the provision of energy, which is dependent on information relating to future energy requirements and supplied by means of at least one part of the transport device, can be carried out by the energy management system by means of the intermediate energy store and/or the energy requirements.

21 Claims, 9 Drawing Sheets

SYSTEM AND METHOD FOR PREDICTIVE MANAGEMENT OF ENERGY SUPPLY TO A TRANSPORT DEVICE

BACKGROUND OF THE INVENTION

The invention relates to an energy management system for a transport device, to a method for operating a transport device and to a transport device. Transport devices for transporting goods and/or people are known, for example, as heavy goods vehicles, passenger vehicles, transporting vehicles and/or lifting devices for, for example, ISO containers or the like (for example lifting device at docks or at a container depot) or else as driverless transport vehicles, in particular for container ports.

Transport devices are in particular fuel-electric vehicles and/or fuel-electric lifting devices in which an internal combustion engine is used as the energy source for obtaining electrical current by means of a generator. The internal combustion engine is provided for combusting fuel which can be carried along by the transport device in a fuel tank. Fuels are, for example, gasoline, diesel, natural gas, hydrogen, etc. The internal combustion engine is advantageously a diesel engine which is mechanically coupled to an electrical generator for the purpose of generating electrical current. The electrical energy generated by means of the electrical generator can be used for an electrical energy consumer. The electrical energy consumer is in particular an electrical drive. The electrical drive is used, for example, for the continued motion of the transport device and/or for lifting and/or lowering loads of a lifting device, the lifting device also being, for example, a transport device.

If the transport device is, for example, a fuel-electric vehicle, such as a straddle carrier (SC) or a rubber-tired gantry crane (RTG) or an automated guided vehicle (AGV), these systems are used in particular for the transfer of goods. In this case, they are used in particular for lifting and lowering as well as transporting loads. Loads are, for example, goods, containers, people, etc. Energy is required for lifting the load, and energy is released for lowering the load. The greater the load, the greater the energy.

In this case, a fuel which is combusted in an internal combustion engine such as, for example, a diesel engine, is often used as the primary energy source. A generator which is coupled to the diesel engine or to another machine, such as, for example, a synchronous generator or else a fuel cell, with which no generator is required, are used for feeding an electrical circuit. The electrical circuit is in the form of an intermediate circuit, for example. For example, electric motors for running gear and/or lifting gear of the transport device are coupled to the electrical circuit. The coupling advantageously takes place by means of a power converter. A battery, a flywheel and/or a capacitor unit (having ultra capacitors, for example) are used as the energy store of the transport device, for example.

A store provided for the consumption of energy in the transport device, such as, for example, an electrical energy store, a chemical energy store and/or a fuel reservoir/tank, is delimited in terms of its storage volume. If the energy store is empty, it needs to be refilled. In order to ensure that the transport device is ready for use, it is known that, when the stored energy falls below a specific minimum store value, a demand for refilling the store(s) takes place. If, for example, the energy store for the fuel is below a specific threshold, this is indicated and a refilling operation is demanded. One disadvantage here is the fact that this refilling operation needs to take place, for example, at a point in time at which a transport task or measure of the transport device needs to be interrupted.

In order to be able to fulfill as many transport tasks or equivalent transport measures as possible, efficient energy management is necessary. DE 200 01 113 U1 has disclosed, for example, a drive apparatus for a fuel-electrically driven vehicle. In fuel-electrically driven vehicles, the vehicle electrical supply system is usually produced/fed via a synchronous generator. In order to save energy, a system can be provided which makes it possible to operate at energy-saving working points. This means that, for example, the diesel engine is preferably operated at an operating point at which as little diesel as possible is consumed. By means of the speed of the diesel assembly being regulated, it is therefore possible to achieve optimization of operation. Excess energy can be stored in an energy buffer store (for example a battery, a flywheel, a capacitor) and can be called upon there for energy consumers. One disadvantage here is the fact that the diesel engine or the generator as the energy source always needs to be designed in terms of their power such that they cover the maximum possible required power. This is disadvantageous, for example, for rubber-tired transshipment devices which are primarily operated with a changing load. These devices are always designed for the maximum load to be expected and therefore are provided with considerably excess dimensions. This also applies to the diesel-electric assembly.

DE 198 26 551 already also discloses, for example, a control system which can be used universally for a hybrid system comprising at least one energy store and an energy source. In this case too, there is the problem of the necessary overdimensioning of the assembly.

SUMMARY OF THE INVENTION

The object of the present invention is to specify an energy management system for a transport device or a related method and a corresponding transport device, with which the energy consumption can be regulated such that the tasks to be carried out by the transport device can be implemented more effectively by this transport device. An increase in the efficiency relates, for example, to:

a) the achievement of savings in terms of energy and/or b) the achievement of an increased degree of usability of a transport device which has a hybrid drive and/or c) the achievement of saving effects owing to the possibility of designing the transport device and the use of smaller energy sources and/or smaller energy buffer stores.

According to one aspect of the invention, this object is achieved by means of an energy management system for a transport device, in particular for a fuel-electric vehicle, which has a primary energy source and optionally in particular an energy buffer store and one or more electrical energy consumer(s), in particular at least one electrical drive, wherein by means of the enemy management system, control and/or regulation: a) of the provision of energy by the enemy buffer store and/or b) of the energy consumption, can be implemented which is dependent on an item of information on a future energy requirement, at least of part of the transport device.

According to another aspect of the invention, this object is achieved by a method for operating a transport device having an energy management system, including a primary energy source, an energy buffer store and one or more electronic energy consumers, in particular at least one electrical drive, wherein an item of information on a future energy requirement is produced by means of an item of information on at least one transport measure to be carried out, the item of information on a future energy requirement of at least part of the transport device is made available to the energy management system, the sequence of transport measures of the transport device is changed on the basis of the item of information on a future energy requirement and a new item of information on the future energy requirement is produced, whereafter control and/or regulation a) of the provision of energy by the energy buffer store (13, 15) and/or b) of the energy consumption is implemented which is dependent on the item of information on a future energy requirement.

According to another aspect of the invention, this object is achieved by a transport device which has an energy management system and includes a primary energy source, an energy buffer store and one or more electronic energy consumers, in particular at least one electrical drive, designed for implementing the method as set forth above.

An energy management system can be used for a transport device, in particular for a fuel-electric vehicle, which has an energy source, in particular an energy buffer store and an electrical energy consumer, in particular at least one electrical drive. The transport device is, for example:

a straddle carrier (SC) or a rubber-tired gantry crane (RTG) or an automated guided vehicle (AGV) or a ship a bus or the like.

With the contribution of the energy store, the energy management allows for optimum economy in terms of energy, for example of SC/RTG/AGV. The energy store is, for example, a battery, a capacitor and/or a flywheel. As has already been described above, the energy source is, for example, a diesel engine which obtains fuel from a diesel tank and is mechanically coupled to an electrical generator for power generation purposes.

By means of the energy management system, control and/or regulation:

a) of the provision of energy by the energy buffer store and/or b) of the energy consumption can be implemented which is dependent on an item of information on a future energy requirement, at least of part of the transport device.

The energy management is therefore capable, for example in the knowledge of transport measures to be implemented in the future, of filling the energy buffer store with energy, for example such that these future transport measures can be implemented. The ability to implement these measures relates, for example, to the quantity of energy and/or to the peak power to be made available.

In one specific embodiment, the transport device does not have an energy buffer store. The item of information on the future energy requirement is in this case used, for example, for the pilot control of the primary energy source, as is also possible in a system with an energy buffer store. For example, in a bus with a hybrid drive, a signal from a traffic light controller can be used to supply a diesel engine (diesel machine) with more fuel even before the beginning of startup by means of electric motors when the traffic lights are switched over to a green signal in order to reduce a power dip. With such a pilot control, the size of a buffer energy store can also be reduced.

The item of information on the future energy requirement can also be used, for example, to reduce the speed of a fuel-driven motor such as, for example, a diesel engine, when the transport device requires less or even no energy. It is therefore also possible to save on energy, since the fuel-driven motor can be run at an optimum speed in each case for the power required of it.

The electrical supply of, for example, mobile transshipment devices as a transport device is always designed for the maximum operating case to be expected. This peak load needs to be managed/covered by the system. The actual demands are considerably lower, however. Owing to an energy management system, it is possible to achieve considerable savings in terms of fuel consumption. During part-load operation, the speed, for example of a diesel assembly which is used as the energy source, is matched to the power requirement. Fed-back energy when lowering the load is stored by means of electrical stores in the form of energy buffer stores. The transshipment devices are as a result considerably cleaner and the energy supply can have smaller dimensions.

Furthermore, the energy management can be designed such that the energy consumption can be influenced. If, for example, one or more transport measures cannot be implemented using the available quantity of energy in the energy buffer store together with the energy source, which is preferably operated at the optimum operating point, the sequence of transport measures can be changed, for example, by means of the energy management such that, once a time has expired in which the energy buffer store can be charged, the transport measure can be implemented.

The item of information on a future energy requirement is, for example:

a load prognosis and/or an item of information on a required peak load and/or an item of information on transport tasks/transport measures from which the load requirement can be determined, etc.

Information on the future energy requirement which can be used depending on the type and/or the use of the transport device are also, for example, the following data:

weight of transport goods (for example container)

positive or negative gradient of a stretch of path diversion information with respect to the length of a new stretch of path headwind or following wind ocean currents in the case of ships etc.

These items of information are advantageously related to time, with the result that it is in each case possible to determine when and which load is demanded from the energy source and/or the energy buffer store. In this context, a load is not to be understood as one which is to be transported or lifted or lowered. Load is to be understood as being the electrical load, i.e. the electrical power.

In accordance with the invention, in this case the advantages described below can be provided:

The internal combustion engine can be designed to be considerably smaller than was previously the case because the peak powers are covered in a targeted manner by the energy buffer store and do not need to be produced by the internal combustion engine/generator.

Savings in terms of fuel can be made during operation since the fed-back energy during lowering operation or during braking operation in the generator mode is fed into the energy store and is not lost as heat in a resistor.

Improved/more optimum utilization of the diesel engine as an energy source and in turn savings in terms of fuel owing to the operation at the optimum working point of the diesel engine.

A reduction in the maintenance complexity owing to more optimum/cleaner utilization of the smaller diesel engine.

In this case, however, the advantages are not restricted to the specific use, for example, of a diesel engine. For example, a fuel cell can also be used as the energy source.

In one advantageous configuration of the energy management system, the item of information on a future energy requirement can be generated and/or stored by means of the energy management system.

For example, a load prognosis can therefore be produced by means of the energy management system. The load prognosis can advantageously also be stored, it in turn being possible to produce a load prognosis following a sequence of transport measures which has been changed owing to a load prognosis. In order to produce the load prognosis, for example, items of information on future transport measures are communicated to the energy management system. These items of information relate, for example, to the weight of loads to be transported or lifted or lowered. Furthermore, for example, items of information on energy-consuming systems, such as, for example, electrical drives, of a transport device are available to the energy management system. Further items of information relate, for example, to the power of the energy source, the optimum operating points of the energy source, the energy content of the energy buffer store, etc.

The energy management is designed such that, by means of this system, at least one of the following operating means of a transport device can be controlled and/or regulated:
the energy source
the energy buffer store
the electrical energy consumer.

In one further advantageous refinement of the invention, the transport device has a means for energy recovery. Such a means is, for example, an electrical drive which is capable of feedback. The electrical drive in this case has an electrical machine and a power converter which is capable of feedback. Feedback takes place, for example, when a load is lowered and the electric motor acts as a type of braking device. A further application is provided when a moving transport device is intended to be braked. In this case too, the electric motor can be used as a motor brake. This takes place, for example, in electrically driven passenger vehicles or in buses.

The energy management system can also be developed to such an extent that, by means of this system, it is not only possible to optimize one transport device, but two or more transport devices can be optimized by means of the energy management. For example, an optimization (reduction) of the energy consumption can thus be implemented in a container terminal of a dock. If, for example, two or more lifting devices can implement transportation of a container and if, in the process, primarily lifting operations are required, a crane which has a lot of energy in the energy buffer store can be selected by the energy management system. If, in a transport task, a container preferably needs to be lowered, for example, and energy can be obtained from this by means of feedback, a lifting device whose energy buffer store needs to be refilled is selected by means of the energy management system. As a result, it is possible to avoid a situation in which a lifting device with a full energy buffer store feeds energy back owing to a container being lowered, can no longer store this energy and the excess energy is lost in a braking resistor.

The advantageous extension of the energy management system to the control and regulation of a plurality of transport devices is not restricted purely to lifting gear such as a crane, for example, but can also be applied, for example, to AGVs or other transport devices.

One further configuration of the energy management system results from the use of fuzzy logic for implementing the energy management. Precisely the fuzzy logic is particularly well suited to the evaluation of items of information with respect to a future energy requirement. This particularly applies to the case of producing a load prognosis. Advantageously, the energy management system is developed such that, with the aid of this system, a load prognosis for the future can be produced on the basis of data from the past. The fuzzy logic can also be designed such that, by means of this fuzzy logic, automatic matching of parameters takes place. It is necessary to change parameters, for example, owing to changes in temperature which influence the capacity of a battery.

The object of the invention is also achieved by a method for operating a transport device, in particular for a fuel-electric vehicle, which has an energy source, an energy buffer store and an electrical energy consumer, in particular an electrical drive. In the energy management system, an item of information on a future energy requirement, at least of part of the transport device, is provided, where after control and/or regulation:

a) of the provision of energy by the energy buffer store and/or b) of the energy consumption is implemented.

This results in the advantages already described above. Further-reaching configurations have also already been described above in terms of content. It is thus advantageous, for example, if an item of information on a future energy requirement is produced by means of at least one transport measure to be carried out. By means of the energy management system, for example the energy consumption of the transport device, can also be controlled and/or regulated such that, depending on the load prognosis, a future energy requirement of the transport device is influenced.

Owing to a load prognosis, for example, future planned operating states of the transport device are also changed, in which case a new load prognosis is then produced.

In one development, the item of information on a transport measure to be carried out is used to determine at least one future peak load, on the basis of which item of information the future peak load is compared with the maximum possible peak load and, when the maximum possible peak load is exceeded:

a) the energy consumption of the transport device is influenced by modifying the transport measure such that the future peak load does not exceed the maximum possible peak load and/or b) the maximum possible peak load is increased by energy being fed into the energy buffer store.

This also results in a more effective design and more effective use of the transport device.

In one advantageous configuration, all the power converters and the entire control plane of a transport device are connected in terms of data technology to the energy management system and deliver items of information to the energy management system which are evaluated in a central energy management system of the transport device. The regulation/control of the power converters is optimized using these items of information. As a result, the flow of energy is regulated such that peak loads to be expected can be managed and, at the same time, a fuel reduction is achieved.

Owing to a combination of crane control, diesel control and energy management with a plurality of energy suppliers in the form of the energy source as the primary energy source (for example diesel engine with generator) and the energy buffer store, it is possible to achieve savings of up to 70% of fuel in comparison with crane assemblies which have been conventional to date. Expected peak load requirements can also be covered by the system, especially by the energy buffer store. As a result, it is possible for the primary energy source to have smaller dimensions. The energy management system can be optimized by means of parameters and preferably has automated optimization by means of, for example, fuzzy logic.

The following setup acts as an example of the advantageous nature of the invention:

| Example of an RTG assembly | Old | According to the invention |
|---|---|---|
| Stacks of 2 containers | | |
| Energy in the braking resistor | 5.75 kWh | 4.64 kWh |
| Energy in the energy buffer store (for example ultracaps) | 1.58 kWh | 0.66 kWh |
| Transfer of two containers | | |
| Energy in the braking resistor | 2.44 kWh | 0.56 kWh |
| Energy in the energy buffer store (for example ultracaps) | 3.86 kWh | 1.90 kWh |
| Total energy required for 4 container movements | 8.19 kWh | 2.64 kWh |
| Energy for, on average, 20 movements per hour | 40.97 kWh | 13.20 kWh |
| Saving on fuel in % | | 68% |

By way of example, advantages also result in such a manner over an entire operating year of a crane, as indicated by way of example in the representation below:

| Example of data relating to one year for a crane | | |
|---|---|---|
| Running power of the diesel machine | 600.00 h/month | |
| Number of container movements | 4700.00 | |
| Average duration of the container movement | 180.00 s | |

| | Old | According to the invention |
|---|---|---|
| Energy consumption for container movements | 9627.40 kWh | 3102.24 kWh |
| Required fuel | 4.00 kWh/l | |
| Fuel required for the container movements | 2406.85 l | 775.56 l |
| Time for the container movements | 235.00 h | |
| Time in the standby mode | 365.00 h | |
| Average fuel consumption in the standby mode | 6.00 l/h | |
| Fuel consumption in the standby mode | 1971.00 | |
| Required fuel per month | 4377.85 l | 775.56 l |

In the standby mode, the energy consumption in a hybrid vehicle with a fuel-electric drive, can be reduced, for example, by the diesel engine being switched off. In this case, sufficient energy still always needs to be kept in the energy buffer store to make it possible for the diesel engine to be started with this energy and, for example, with a generator now functioning as a motor.

BRIEF DESCRIPTION OF THE DRAWING

Exemplary configurations of the invention are disclosed in the Figures described below, in which.

DETAILED DESCRIPTION OF PREFERRED EMBODIMENTS

Figure 1:
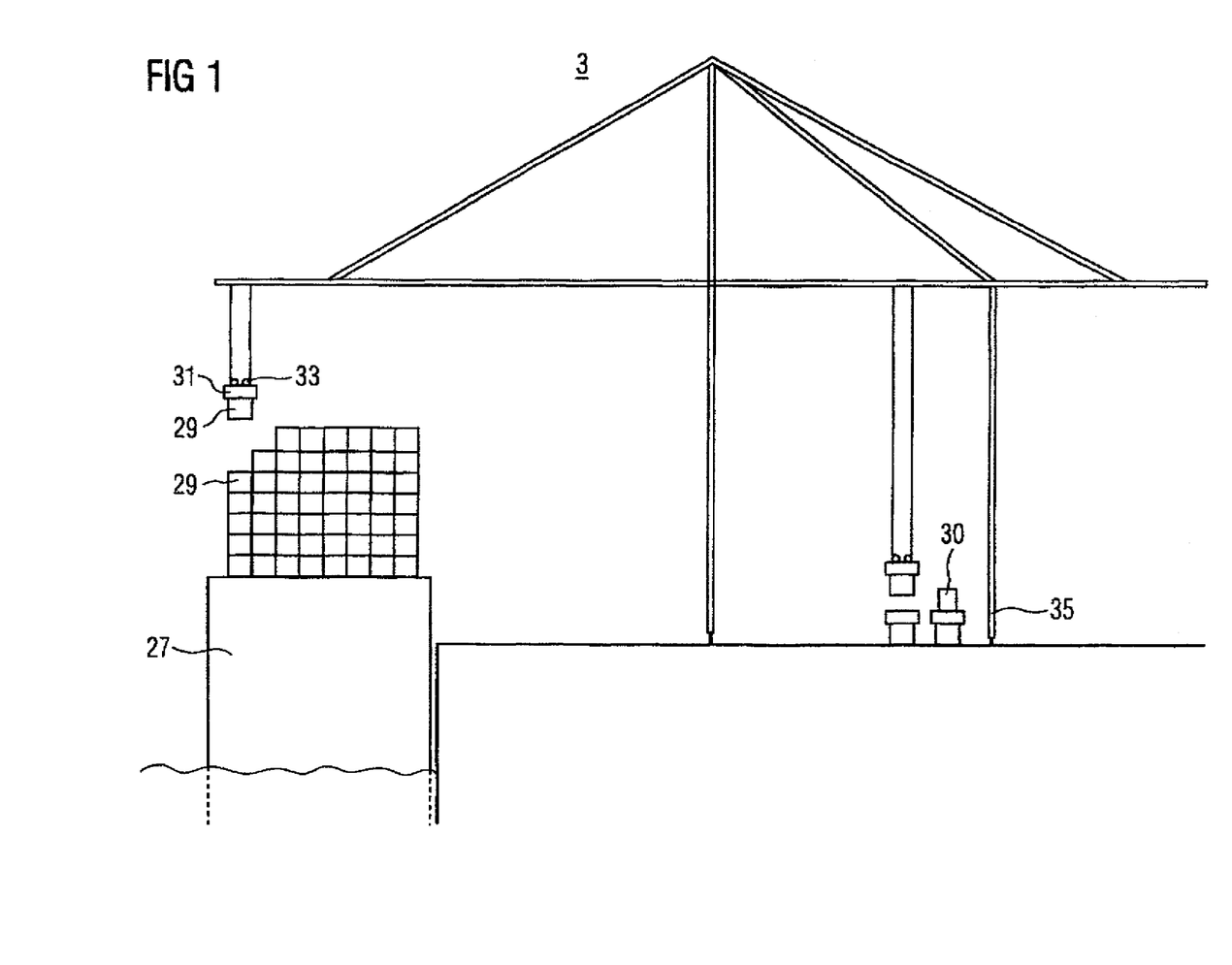
FIG. 1 shows a portlier.

The illustration shown in FIG. 1 shows a portlier 3 as an example of a transport device. A container ship 27 can be loaded and/or unloaded with the aid of the portlier 3. Containers can be transported with the aid of a spreader 31 and a trolley 33. Driving takes place by means of electrical drives. The containers are loaded, for example, onto driverless transport vehicles 35. Both the portlier 3 and the driverless transport vehicle represent examples of transport devices.

The portlier 3 is also an example of a transshipment device, which can be used for lifting and lowering loads. The transshipment device can be designed such that, during lowering, a lifting gear motor feeds energy back into a vehicle supply system. This energy is advantageously stored in an energy buffer store. The retrieval of the stored energy is coordinated by an energy management system, as a result of which, for example, peak powers to be expected can be covered in a targeted manner. The particular feature of this system is firstly the optimum design of all system components and the energy management. The implementation of a plurality of drives having different powers requires a complex system for optimum utilization of energy. Both the energy buffer store and the energy management system are illustrated by way of example in FIG. 6.

Figure 2:
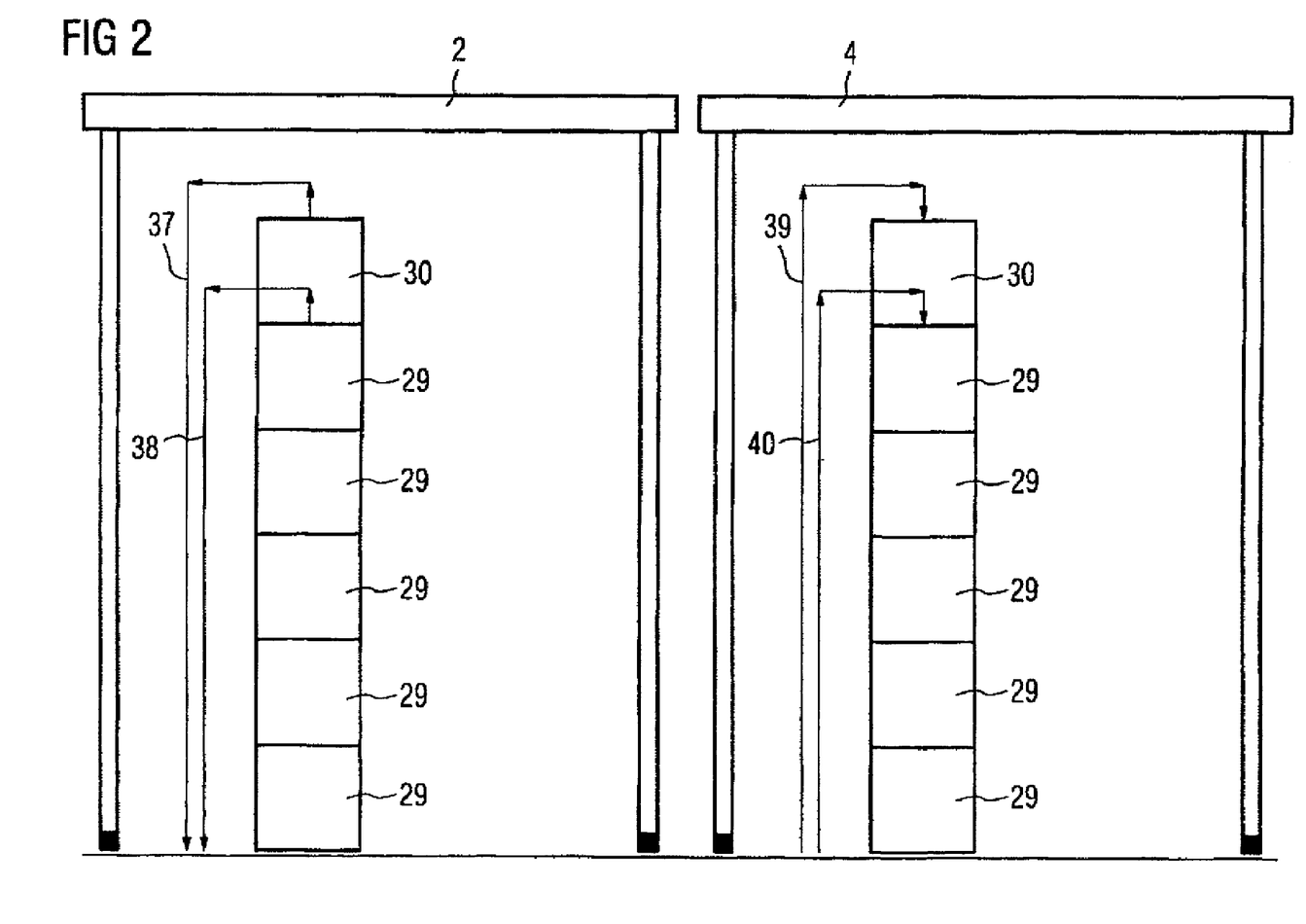
FIG. 2 shows possible transport measures of a lifting device.

The lifting 39 and lowering 37 of containers 29, 30 as a load is illustrated in FIG. 2. In this case, FIG. 2 shows portrayers 2, 4. With the portlier 2, lowering operations 37, 38 (setdown operation) of containers 29, 30 are illustrated. The energy output when lowering the load is advantageously stored in an energy store. In order to lift the load, this energy is removed from the energy store (for example a battery). For the case in which the container 30 assumes the uppermost stack position, this is the worst case for a lifting operation 39 (stacking operation) on the portlier 4. In order to position the container 30, the most energy therefore needs to be consumed. The container 30 then also has the highest potential energy, however, with the result that, during lowering 37, the most energy can be released. This energy is advantageously stored by means of a drive which is capable of feedback in an energy buffer store. This is shown in one of the subsequent Figures. Less energy consumption is associated with the lifting (stacking) 40 of the containers 29 and the lowering (setdown) 37. The energy management system now has, for example, the task of always keeping sufficient energy for continuing to make it possible to carry out a transport measure 37, 38, 39, 40. If insufficient energy is available—for example in the energy buffer store—for an intended transport measure—for example the setdown and/or stacking of containers—a transport measure needs to be selected, for example, for which the available energy is sufficient.

Figure 3:
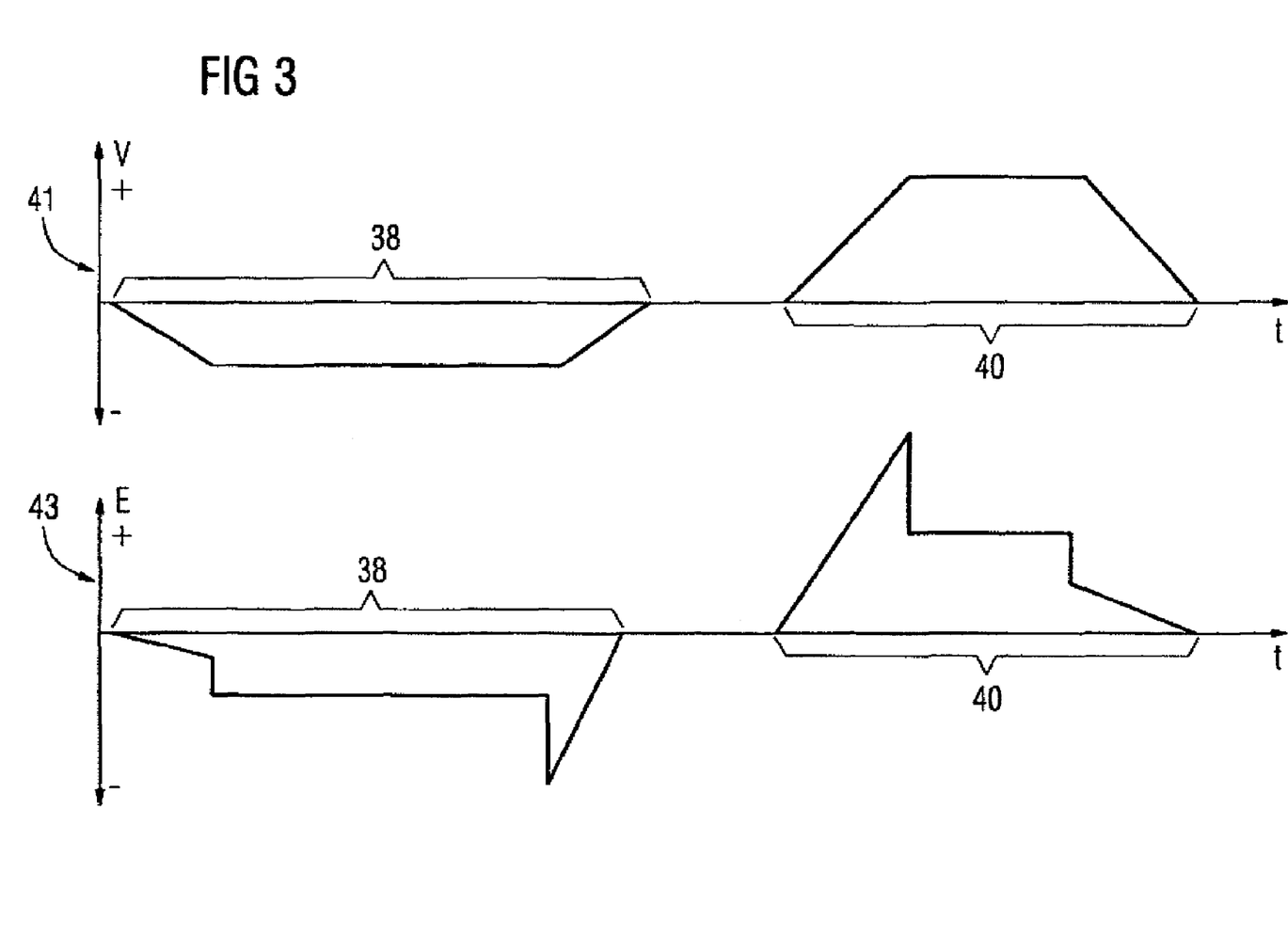
FIG. 3 shows an energy flow in transport measures.

The illustration in FIG. 3 shows, in a first graph 41, the speed v of an electrical drive over time t, for example in the case of a lifting operation 40 and a lowering operation 38, as are already illustrated in FIG. 2. In a second graph 43, the energy E which is required for lifting and lowering as shown in graph 41 is plotted over time t. The energy required for lifting can therefore likewise be calculated, as can the energy which can be released by the lowering. It is thus possible to produce an energy balance which can be used for the energy management.

Figure 4:
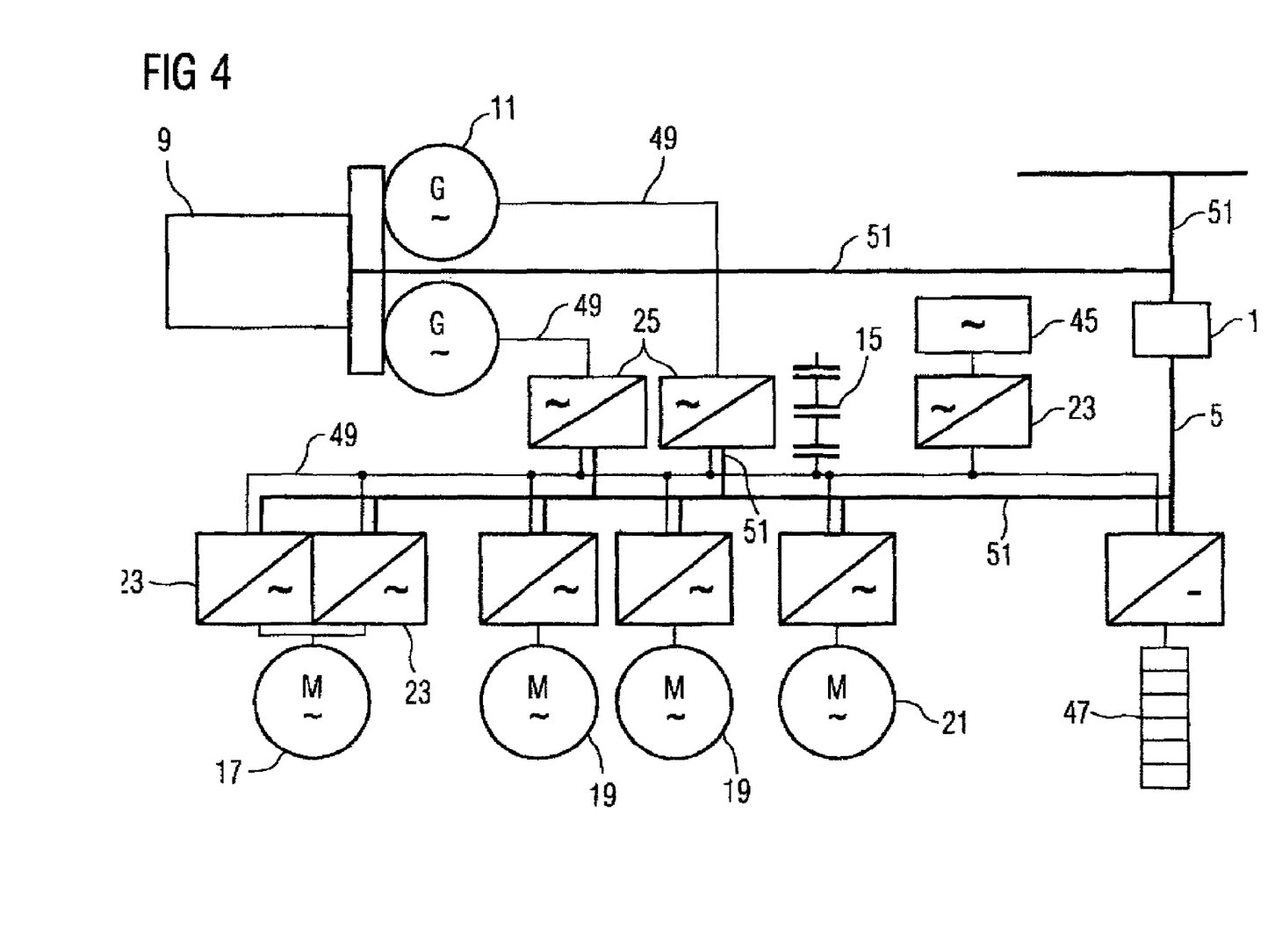
FIG. 4 shows devices for the energy supply to and the energy consumption of a transport device.

The illustration shown in FIG. 4 shows an exemplary arrangement of:
- an energy source 9 as the diesel engine with a connected electrical generator 11,
- electrical drives which have power converters 23 and electrical machines 17, 19, 21,
- an electrical auxiliary device 45, such as, for example, a sensor device,
- an energy management system 1,
- an energy buffer store in the embodiment as capacitors 15, and
- a braking resistor 47.

The electrical machine 17 is used for lifting and lowering loads. The electrical machines 19 are used for the gantry. The electrical machine 21 is used for the trolley. By means of an energy bus system 49, the electrical energy obtained by means of the energy source 11 can be distributed. By means of a data bus system 51, the energy management system 1 is connected to components which can be controlled and/or regulated. These components are, for example, the generator 11, the internal combustion engine 9, the electrical machines 17, 19 and 21 and/or the power converters 25. The data bus system 51 is used in particular for transmitting desired and actual values. Items of information on the position of the load or the twistlocks (not illustrated in FIG. 4) can also be transmitted using the energy management 1.

The generator 11 is, for example, always operated with speed regulation at the optimum load point 55 (see FIG. 5), depending on the required energy/power. In the generator mode, the generator 11 will drive, for example, a diesel assembly 9 and control the fuel injection, by means of the energy management system, to zero. Furthermore, the energy management system makes it possible, for example, for the diesel assembly 9 as the primary energy source to be brought to a standstill, the rotating energy which is released in the process being taken over in an energy buffer store (not illustrated in this FIG.). Subsequently, the diesel assembly 9 can be restarted via the generator 11. This restarting can then also again take place very rapidly, for example within approximately 200 ms, by means of the generator 11 operated as a motor. Within 2 seconds, 100% of the load can be supplied.

Diesel-electric transshipment devices (not illustrated in FIG. 4) are nowadays operated by synchronous generators 11 driven by diesel engines. The speed of the assembly needs to be kept constant about a constant frequency and constant voltage for the main drives and consumers on the crane. When lowering the load, energy is consumed by braking resistors. According to the invention, for example when using a converter together with the energy management system, the permanent constant speed is no longer required.

Figure 5:
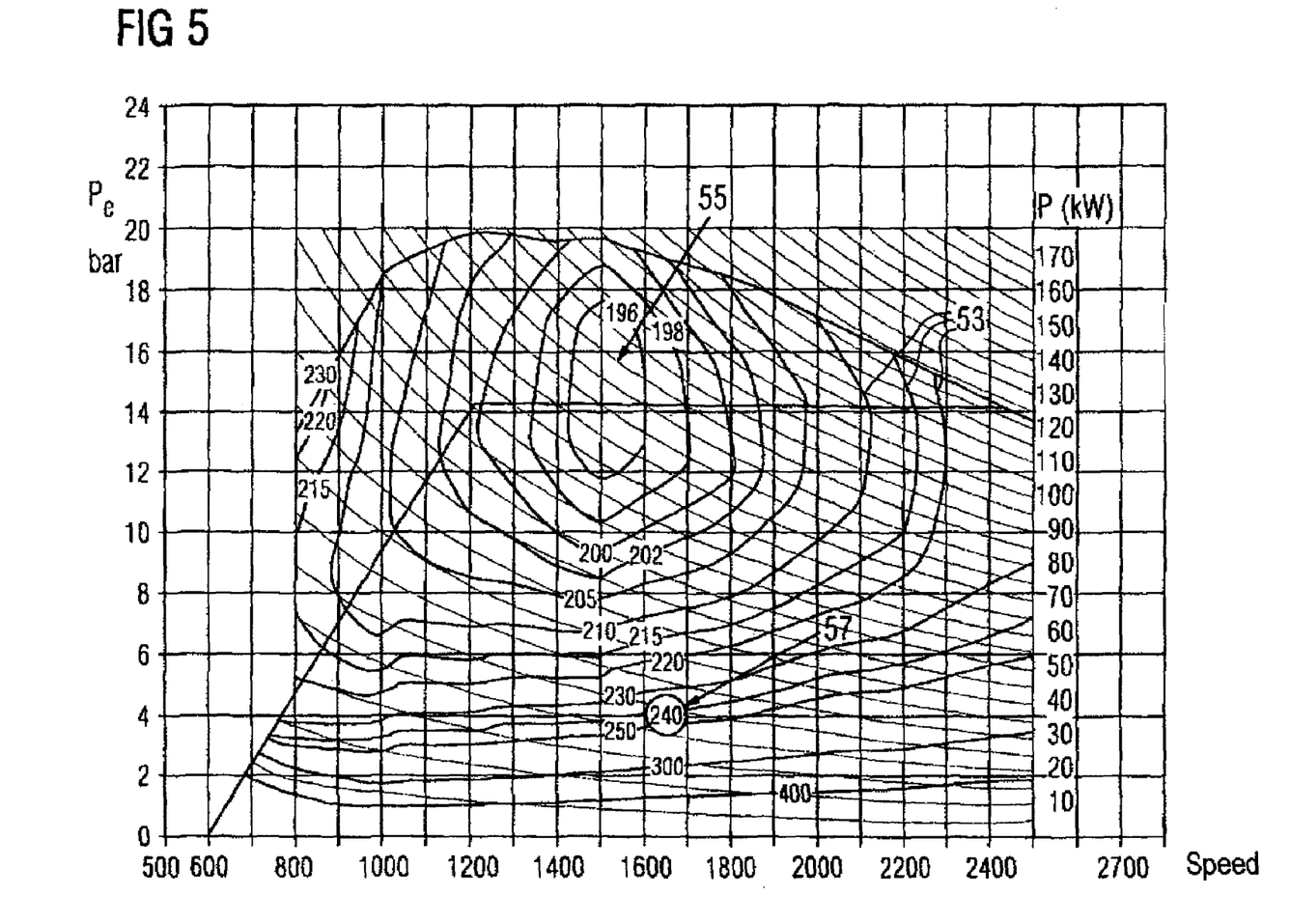
FIG. 5 shows a graph of operating points of a diesel engine.

The illustration shown in FIG. 5 shows operating points of a diesel engine. Here, it can be seen that the diesel engine has advantageous operating points at which a minimum consumption of diesel is possible. In the graph, lines 53 with the same diesel consumption 57 in g/kWh are illustrated. At an optimum operating point, the diesel engine is used optimally with respect to the energy consumption. One task of an energy management system is, for example, to keep the operation of an internal combustion engine or of a diesel engine at or in the region of the optimum operating point 55. It is particularly successful when the future energy requirement is known and/or estimated by means of a load prognosis. Advantageously, precise data are accessible in the load prognosis such that the future energy requirement can be determined very precisely.

Figure 6:
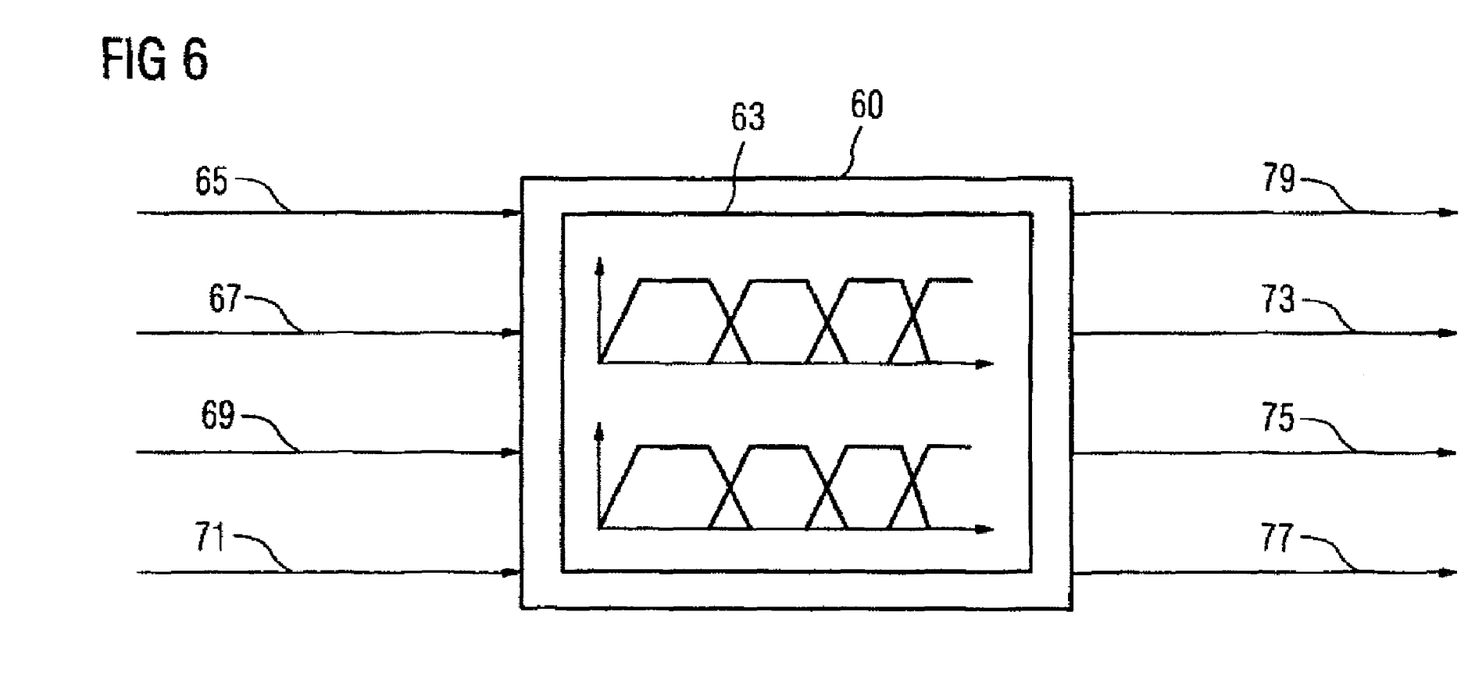
FIG. 6 shows an energy management system with implemented fuzzy logic.

The illustration shown in FIG. 6 shows an energy management system 60 with symbolically illustrated, integrated fuzzy logic 63. The illustration shows which possible input signals can be used in an energy management system. Input signals are, for example:
- twistlock signal 65 for the pilot control,
- height of the load 67,
- weight of the load 69,
- energy 71 available in the energy buffer store
...

Output signals of the energy management system are, for example, desired variables for the:
- speed of the diesel engine 73,
- speed of the electrical machines for lifting, lowering, driving 75,
- loss of energy in the braking resistor 77 and/or
- energy consumption in the energy buffer store 79.

The symbolically illustrated fuzzy logic makes it possible for the energy management system in particular to optimize itself. With the aid of continuous optimization, manipulated variables can be adapted such that very good results can be achieved with them.

Figure 7:
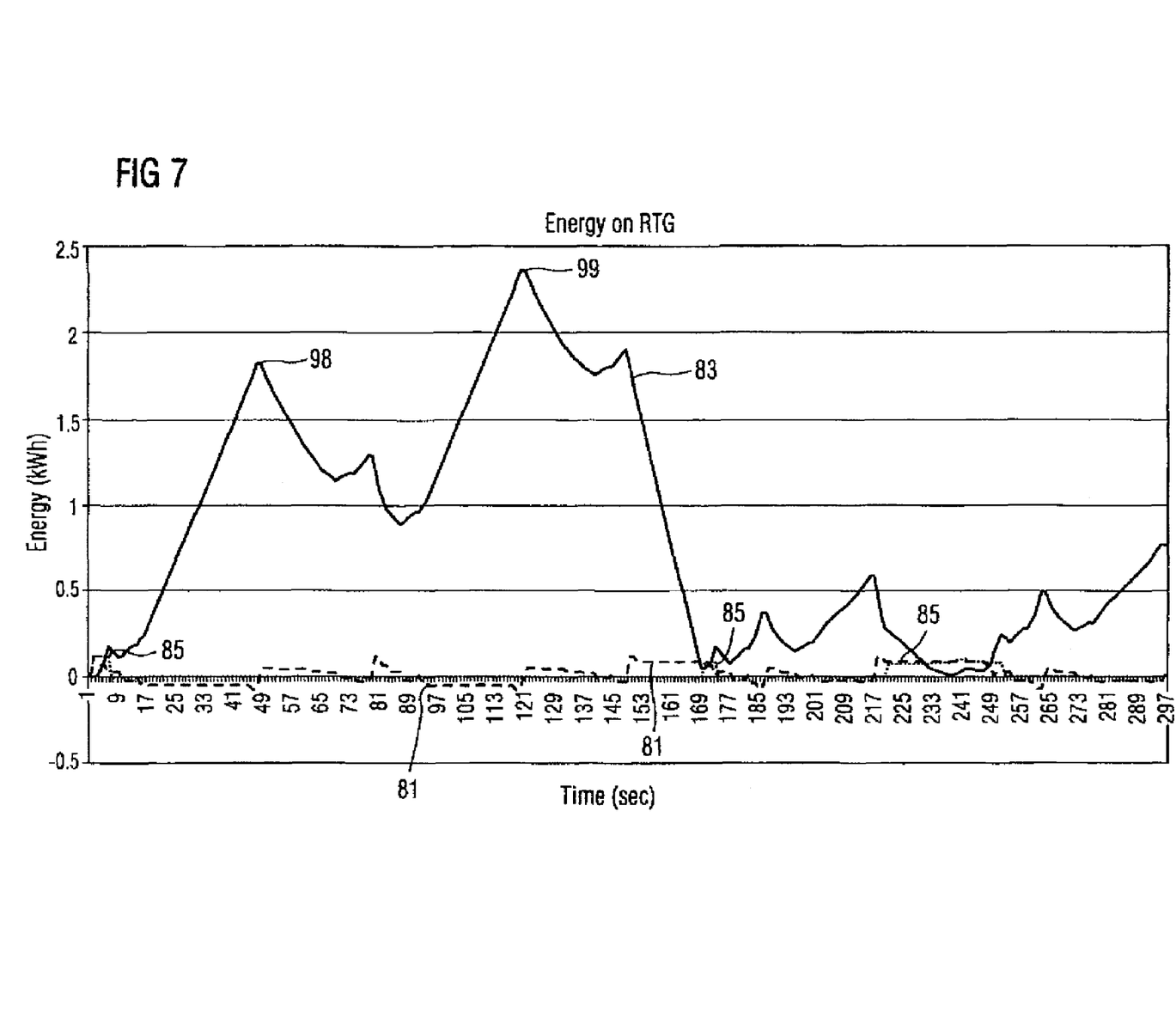
FIG. 7 shows a graph of energy flows.

The illustration shown in FIG. 7 shows a load flow 81, the energy content in the energy buffer store 83 and the energy 85 output by the diesel engine. Owing to pilot control in the form of an item of information on a future energy requirement, it is possible to avoid a delay in the regulation as regards the provision of the required energy. There is therefore no wait before the energy is requested, but it is calculated in advance which energy is required and, on the basis of this, the energy management system will undertake active control. This results in a system without deadtimes.

Figure 8:
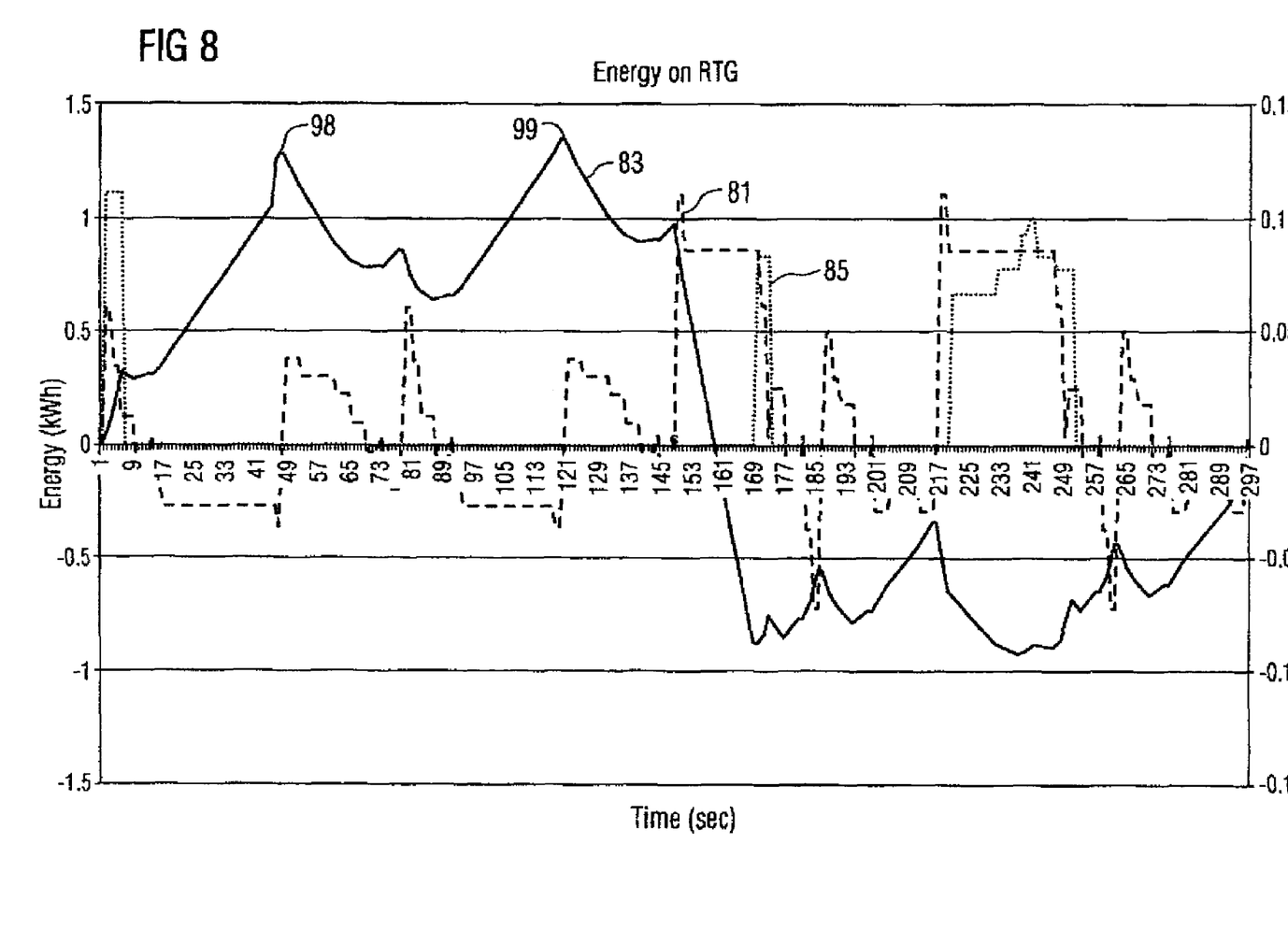
FIG. 8 shows a further graph of an energy flow.

The illustration shown in FIG. 8 shows a further example of a load flow 81, the energy content in the energy buffer store 83 and the energy 85 output by the diesel engine for lifting and lowering containers. In this case, the energy of the energy buffer store is plotted on the left-hand side in the graph. The energy for the load flow 81 on an energy bus system of the transport device and for the output energy of the primary energy source 85 is plotted on the right-hand side in the graph. Owing to the scale being spread, a more detailed illustration is possible.

Both in FIG. 7 and in FIG. 8, in temporal sequence, a first lowering of a container and then a second lowering of a container take place, with the result that the energy 83 that is stored in the energy buffer store has two high peaks 98, 99. After lowering, at least one lifting operation takes place.

Figure 9:
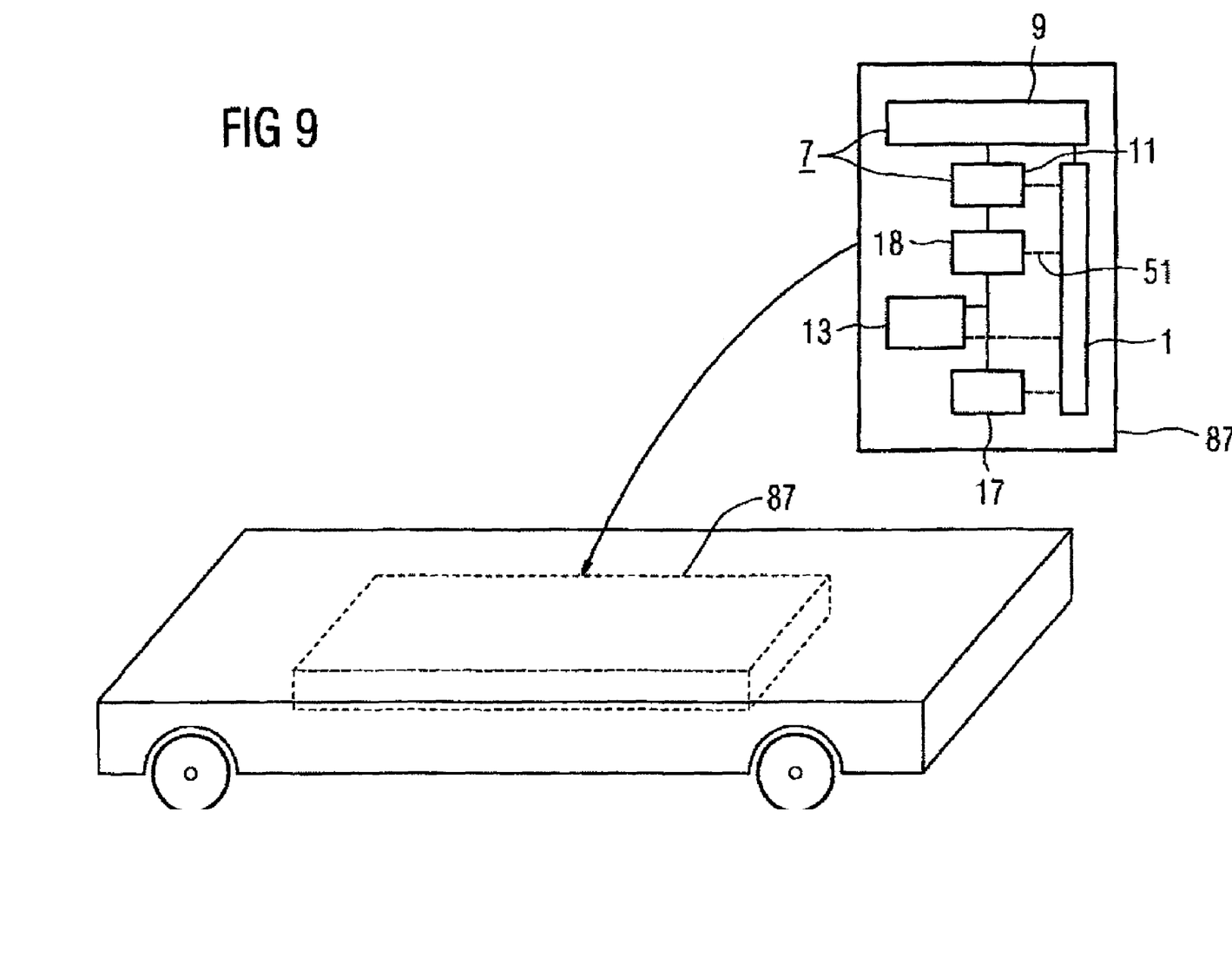
FIG. 9 shows a driverless transport device.

The illustration shown in FIG. 9 shows a driverless vehicle 5 which has a system 87. The system 87 has an energy source 7, an energy buffer store 13, an electrical machine 17 and 18 and an energy management 1. The energy source 7 has an electrical generator 11 and an internal combustion engine 9. The vehicle is therefore a hybrid vehicle. With the aid of the databus system 51, the energy management system 1 is connected to the components of the system 87 which need to receive data signals from this energy management system and/or transmit data signals to said energy management system.

What is claimed is:

1. A method for operating a transport device having a primary energy source, an energy management system and at least one electronic energy consumer, said method comprising the steps of:
    producing a first item of information regarding a future energy requirement of at least part of the transport device using an item of information regarding at least one transport measure to be carried out, said future energy requirement including at least one peak load;
    providing the first item of information to the energy management system;
    changing a sequence of transport measures provided by the transport device using the first item of information, so that storage and use of energy by the transport device is managed using the first item of information;
    comparing the future peak load to a maximum possible peak load;
    managing a relationship between energy consumption by the transport device and maximum possible peak load so that the future peak load does not exceed the maximum possible peak load; and
    producing a second item of information regarding the future energy requirement of at least part of the transport device.

2. The method of claim 1, wherein the first item of information is supplied by the energy management system.

3. The method of claim 1, wherein the energy management system manages the energy used by the transport device using fuzzy logic.

4. The method of claim 3, wherein the first item of information includes a load prognosis based on past usage data.

5. The method of claim 1, further comprising the step of optimizing the energy consumption of a plurality of transport devices.

6. The method of claim 1, further comprising the step of temporarily switching off the primary energy source.

7. The method of claim 1, further comprising the steps of changing future planned operating states of the transport device based on the first item of information.

8. The method of claim 1, wherein the sequence of transport measures is changed by changing the provision of energy by an energy buffer store as a function of the first item of information, or by changing energy consumption by the energy consumer as a function of the first item of information.

9. The method of claim 1, further comprising the step of changing the sequence of transport measures provided by the transport device using the item of information, so that storage and use of energy by the transport device is managed using the second item of information regarding the future energy requirement.

10. The method of claim 1, wherein at least one of the first or second item of information is generated or stored by the energy management system.

11. The method of claim 1, further comprising the step of modifying the energy consumption of the transport device by modifying the at least one transport measure so that the future peak load determined for the modified transport measure does not exceed the maximum possible peak load.

12. The method of claim 1, further comprising the step of increasing the maximum possible peak load by increasing the energy fed into an energy buffer store so that the future peak load does not exceed the maximum peak load.

13. A transport device, comprising:
    a primary energy source;
    at least one electronic energy consumer; and
    an energy management system, said energy management system including:
    means for producing a first item of information regarding a future energy requirement of at least part of the transport device using an item of information regarding at least one transport measure to be carried out, said future energy requirement including at least one peak load;
    means for providing the first item of information to the energy management system;
    means for changing a sequence of transport measures provided by the transport device using the first item of information, so that storage and use of energy by the transport device is managed using the first item of information;
    means for comparing the future peak load to a maximum possible peak load;
    means for managing a relationship between energy consumption by the transport device and maximum possible peak load so that the future peak load does not exceed the maximum possible peak load; and
    means for producing a second item of information regarding the future energy requirement of at least part of the transport device.

14. The transport device of claim 13, further comprising means for energy recovery, said means for changing the sequence of transport measures provided by the transport device being adapted to modify the energy recovery provided by said means for energy recovery.

15. The transport device of claim 14, wherein said means for energy recovery includes an energy buffer store.

16. The transport device of claim 13, further comprising an automated guided vehicle for transporting goods or people.

17. The transport device of claim 13, wherein at least one electronic energy consumer is an electrical drive.

18. The transport device of claim 13, wherein the sequence of transport measures is changed by changing the provision of energy by an energy buffer store as a function of the first item of information.

19. The device of claim 13, wherein the sequence of transport measures is changed by changing energy consumption by the energy consumer as a function of the first item of information.

20. The device of claim 13, further comprising the step of modifying the energy consumption of the transport device by modifying the transport measure so that the future peak load determined for the modified transport measure does not exceed the maximum possible peak load.

21. The device of claim 13 further comprising the step of increasing the maximum possible peak load by increasing the energy fed into an energy buffer store so that the future peak load does not exceed the maximum peak load.

* * * * *